(12) United States Patent
Billgren et al.

(10) Patent No.: US 11,960,316 B2
(45) Date of Patent: Apr. 16, 2024

(54) MEDIA CONTENT PROVISION IN A COMPUTER NETWORK

(71) Applicant: Acast AB (publ), Stockholm (SE)

(72) Inventors: Johan Billgren, Stockholm (SE); Juan Ignacio Jimenez de Luis, Stockholm (SE); Katie Rogers, Stockholm (SE); Michael Lindfors, Stockholm (SE)

(73) Assignee: Acast AB (publ), Stockholm (SE)

( * ) Notice: Subject to any disclaimer, the term of this patent is extended or adjusted under 35 U.S.C. 154(b) by 243 days.

(21) Appl. No.: 17/594,785

(22) PCT Filed: Apr. 29, 2019

(86) PCT No.: PCT/EP2019/060957
§ 371 (c)(1),
(2) Date: Oct. 29, 2021

(87) PCT Pub. No.: WO2020/221426
PCT Pub. Date: Nov. 5, 2020

(65) Prior Publication Data
US 2022/0222322 A1    Jul. 14, 2022

(51) Int. Cl.
*G06F 21/10* (2013.01)
*H04L 9/40* (2022.01)

(52) U.S. Cl.
CPC ............ *G06F 21/10* (2013.01); *H04L 63/102* (2013.01)

(58) Field of Classification Search
CPC .................................. G06F 21/10; H04L 9/40
See application file for complete search history.

(56) References Cited

U.S. PATENT DOCUMENTS 7,343,419 B1 * 3/2008 Robinson ................ G06F 16/40
                                                                 348/E7.071
8,566,462 B2   10/2013 Jun et al.
(Continued)

OTHER PUBLICATIONS

International Preliminary Report on Patentability for PCT Application No. PCT/EP2019/060957, dated Aug. 13, 2021, 13 pages.
(Continued)

*Primary Examiner* — Viral S Lakhia
(74) *Attorney, Agent, or Firm* — Brake Hughes Bellermann LLP

(57) ABSTRACT

A method (200) of providing a media content in a computer network is provided, including, in a server system (222) of a media content provider (220): obtaining a user identification, UID, of a user (210) registered with a partner (230) of the media content provider, and a content identification, CID, of a media content offered by the media content provider; generating a first token associated with the obtained UID and CID; storing (226-1) the first token in a data storage (224); providing (226-2) a reference to a web resource to the user and/or to the partner, the reference including a second token equal to, or at least associated with, the first token; receiving (216-2) a first request from the user to access the web resource, the first request including the second token; providing (226-3) the web resource to the user, the web resource identifying a network location and including a third token equal to, or at least associated with, at least one of the first token and the second token; receiving (216-3) a second request from the user to access the network location, the second request including the third token; confirming (226-4), based at least on a comparison of the third token with the first token stored in the data storage, whether the user is allowed an access to at least part of the media content, and, if confirming that the user is allowed the
(Continued)

access, providing (226-5) at least part of the media content to the user.

14 Claims, 3 Drawing Sheets

(56) References Cited

U.S. PATENT DOCUMENTS

| | | | | |
|---|---|---|---|---|
| 8,726,403 | B2* | 5/2014 | Huang | H04N 21/25816 |
| | | | | 713/168 |
| 8,910,241 | B2* | 12/2014 | Pollutro | G06F 21/6218 |
| | | | | 726/13 |
| 9,032,497 | B2* | 5/2015 | Padala | G06F 21/10 |
| | | | | 726/10 |
| 9,210,154 | B2* | 12/2015 | Okamoto | H04L 63/08 |
| 9,338,141 | B2* | 5/2016 | Cosentino | H04L 63/0807 |
| 9,485,258 | B2 | 11/2016 | Delany | |
| 9,607,132 | B2* | 3/2017 | van Brandenburg | |
| | | | | H04L 63/0807 |
| 10,057,366 | B2* | 8/2018 | Su | H04B 7/18578 |
| 10,178,098 | B2* | 1/2019 | Sanso | H04L 67/1097 |
| 10,225,085 | B2* | 3/2019 | Drouin | G06T 19/006 |
| 10,237,080 | B2* | 3/2019 | Wu | H04M 15/48 |
| 2006/0259492 | A1 | 11/2006 | Jun et al. | |
| 2007/0219910 | A1 | 9/2007 | Martinez | |
| 2007/0277233 | A1* | 11/2007 | Bodin | G06F 21/10 |
| | | | | 726/9 |
| 2017/0311007 | A1* | 10/2017 | Naccache | H04L 9/0894 |
| 2018/0181670 | A1* | 6/2018 | Goel | G06F 16/9538 |

OTHER PUBLICATIONS

International Search Report and Written Opinion for PCT Application No. PCT/EP2019/060957, dated Dec. 16, 2019, 14 pages.

* cited by examiner

MEDIA CONTENT PROVISION IN A COMPUTER NETWORK

CROSS REFERENCE TO RELATED APPLICATION

This application is a 35 U.S.C. § 371 National Phase Entry Application from PCT Application No. PCT/EP2019/060957, filed on Apr. 29, 2019, entitled "MEDIA CONTENT PROVISION IN A COMPUTER NETWORK", and designating the U.S., the disclosure of which is incorporated herein in its entirety by reference.

TECHNICAL FIELD

The present disclosure relates to the provision of syndicated media content in a computer network. In particular, the present disclosure relates to provision of exclusive media content from a media content provider to a user registered with a partner to the media content provider.

BACKGROUND

Using the Internet, a subscription provider may provide its registered users with a possibility to download, stream or in other ways consume various media contents such as podcasts, movies, music and similar. Instead of hosting such media contents on its own, the subscription provider may enter a partnership with one or many dedicated content providers. By so doing, the subscription provider may focus on only handling the subscriptions of its various users, and leave eventual problems related to content creation, bandwidth supply and high traffic handling to the various media content providers. In addition, by providing such syndicated media contents from a plurality of different media content providers, the subscription provider may offer its registered users a greater depth of available content and thus make itself more attractive for both present and potential future users.

However, a problem may arise in that the various media content providers do not have access to information about the various users registered with the subscription provider, and it may therefore be difficult for a media content provider to know whether a request from a specific user to access a specific media content should be allowed or not.

SUMMARY

To at least partly solve the above problem, the present disclosure seeks to provide an improved way of providing a media content in a computer network. To achieve this, a method and a system of/for providing a media content in a computer network, as defined in the independent claims, are provided. Further embodiments of the present disclosure are provided in the dependent claims.

According to a first aspect of the present disclosure, a method of providing a media content in a computer network is provided. The method is performed in a server system of a media content provider. The method may include obtaining a user identification (UID) of a user. The user may be registered with a partner of the media content provider. The method may include obtaining a content identification (CID) of a media content offered by the media content provider. The method may include generating a first token. The first token may be associated with the obtained UID and CID. The method may include storing the generated first token in a data storage. The method may include providing a reference to a web resource to the user and/or to the partner. The reference may include a second token. The second token may be equal to, or at least associated with, the first token.

The method may further include receiving a first request from the user to access the web resource. The first request may include the second token. The method may further include providing the web resource to the user. The web resource may identify a network location and include a third token. The third token may be equal to, or at least associated with, at least one of the first token and the second token.

The method may include receiving a second request from the user to access the network location. The second request may include the third token. The method may include confirming, based at least on a comparison of the third token with the first token stored in the data storage, whether the user is allowed an access to at least part of the media content. The method may also include, if it is confirmed that the user is allowed the access, providing at least part of the media content to the user.

In some embodiments, the UID and CID to which the first token is associated may also be stored in the data storage.

In some embodiments, the method may include a further step of obtaining, before the above step of confirming whether the user is allowed an access to at least part of the media content, an indication from the partner on whether the user is allowed the access and updating the data storage accordingly.

In some embodiments, the method may include invalidating or removing the first token in/from the data storage if it is indicated (by the partner) that the user is not allowed the access.

In some embodiments, the method may include receiving the indication from the partner after at least the step of providing the reference to the web resource to the user and/or to the partner. Phrased differently, the method may include receiving the indication after providing the reference to the web resource to the user (and/or partner) but before at least part of the media content is provided to the user.

In some embodiments, the step of confirming whether the user is allowed the access may include confirming whether the user is allowed the access based on a user policy.

In some embodiments, the step of confirming whether the user is allowed the access may include confirming whether the user is allowed the access based on whether the second request originates from one or more specific network addresses. Phrased differently, it may be checked whether the second request originates from one or more allowed network addresses (e.g. ip numbers), whether the second request originates from one or more disallowed network addresses, whether the second request originates from one or more network addresses which have been used to access the media content (or for example also other media content) more than a predefined number of times, or the like.

In some embodiments, the step of confirming whether the user is allowed the access may include confirming whether the user is allowed the access based on whether the user has previously accessed at least part of the media content more than a specific number of times.

In some embodiments, the step of confirming whether the user is allowed the access may include confirming whether the user is allowed the access based on whether the second request is made within a predefined time window.

In some embodiments, the step of confirming whether the user is allowed the access may include confirming whether the user is allowed access to only a part of the media content or to a whole of the media content. The step of providing at least part of the media content to the user (if it is confirmed that the user is allowed the access) may then include, if it is confirmed that the user is allowed access to only a part of the media content, providing only the part of the media content to the user, or, if it is confirmed that the user is allowed access to a whole of the media content, providing the whole of the media content to the user.

In some embodiments, the method may further include a step of, if it is confirmed that the user is not allowed the access (to either part or whole of the media content), providing no part of the media content, only a part of the media content or a different media content to the user.

In some embodiments, the web resource may be a structured document. Preferably, the web resources may be an RSS (e.g. RDF Site Summary/Rich Site Summary/Really Simple Syndication) document or another document of an XML (Extended Markup Language) format. The web resource may include an element (e.g. a "tag") identifying the network location.

In some embodiments, the method may further include gathering statistical information regarding the user and attempts at accessing the media content, and providing at least part of the statistical information to the partner.

In some embodiments, the UID and the CID may be received from the partner.

In some embodiments, the UID and the CID may be received from the user. The method may include contacting the partner to confirm whether the user is allowed an access to at least part of the media content identified by the CID.

According to a second aspect of the present disclosure, a server system for providing a media content in a computer network is provided. The server system may include a computer processor. The server system may include a non-transitory computer readable medium storing instructions operable, when executed by the processor, to cause the processor to perform a method as described herein according to the first aspect and its associated embodiments.

According to a third aspect of the present disclosure, a non-transitory computer readable medium is provided. The medium may store instructions operable, when executed by a computer processor, to perform the method as described herein according to the first aspect and its associated embodiments. The medium referred to in the server system of the second aspect may for example be the medium described herein according to the third aspect and its associated embodiments.

Advantages and features of the method according to the first aspect applies just as well to the server system according to the second aspect and the storage medium according to the third aspect, and vice versa. The present disclosure relates to all possible combinations of features as recited e.g. in the claims. Further objects and advantages of the various embodiments of the present disclosure will be described below by means of one or more exemplifying embodiments.

BRIEF DESCRIPTION OF THE DRAWINGS

Exemplifying embodiments will be described below with reference to the accompanying drawings, in which.

Figure 1:
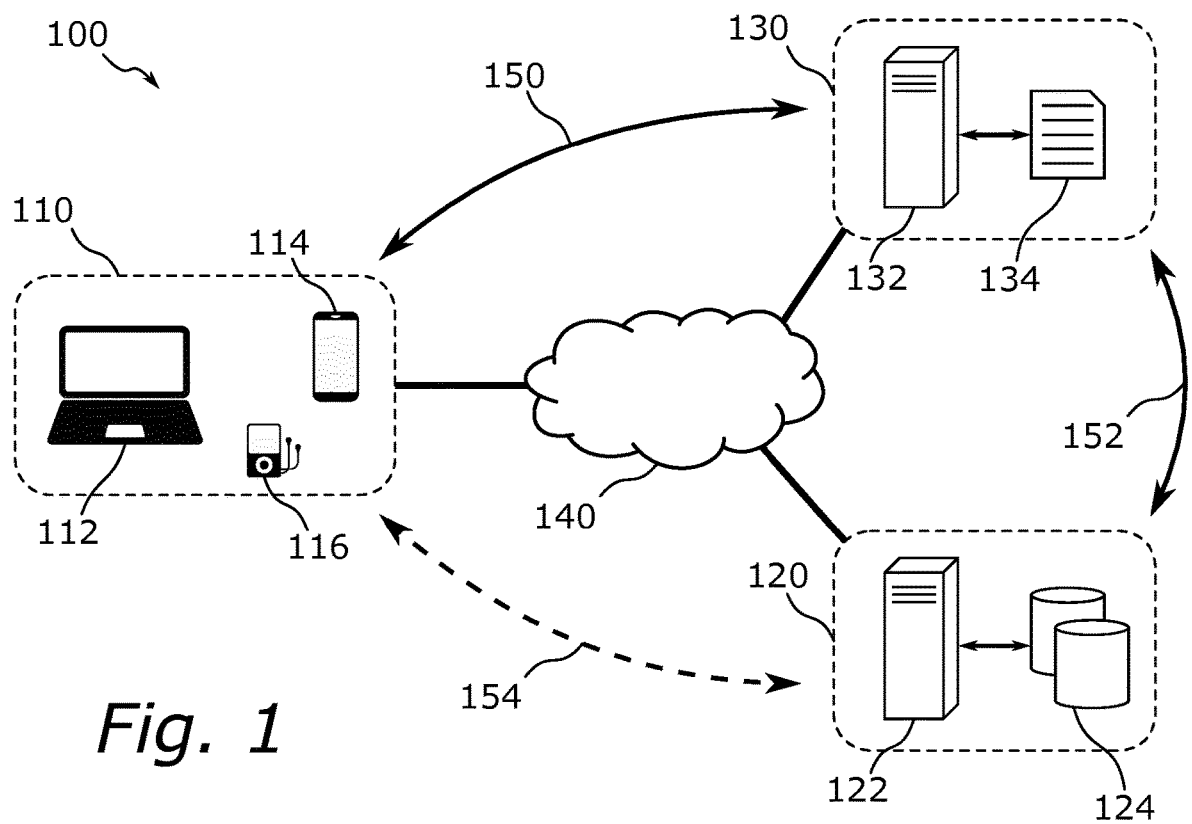
FIG. 1 illustrates schematically a computer network in which a method according to the present disclosure may be performed.

In the drawings, like reference numerals will be used for like features or elements unless stated otherwise. Unless explicitly stated to the contrary, the drawings show only such elements that are necessary to illustrate the example embodiments, while other elements, in the interest of clarity, may be omitted or merely suggested. As illustrated in the figures, the sizes of elements and regions may not necessarily be drawn to scale and may e.g. be exaggerated for illustrative purposes and, thus, are provided to illustrate the general structures of the embodiments.

DETAILED DESCRIPTION

With reference to FIG. 1, a scenario in which a method according to the present disclosure may be used will now be described in more detail.

FIG. 1 illustrates schematically a computer network 100, wherein a user or client 110, a media content provider 120 and a partner 130 to the media content provider 120 are all connected together via a network infrastructure 140. The network infrastructure 140 (illustrated by the cloud) may for example be the Internet, an intranet, a local network or similar, or combination thereof.

As indicated by arrow 150, the user 110 is related to the partner 130 at least in that the user 110 is registered with the partner 120. The user 110 may for example be a registered subscriber to a service offered by the partner 120. The offering of the service may be free, or the user 110 may be required to pay one or more fees to the partner 130 before being allowed to consume the service. In other situations, it may be envisaged that the partner 130 may provide e.g. a limited service offering to the user 110 for free, while a full or more extensive service offering is available to the user 110 only after the user 110 has paid, or at least promised to pay, the one or more fees to the partner 120. A fee may for example be a one-time fee, a recurring fee (such as e.g. a monthly or yearly fee), or e.g. a pay-per-view/listen fee.

The user 110 may use for example one or more of a computer 112, a smartphone 114, a dedicated media payer 116, or similar, to consume a service offered by the partner 120. It is envisaged that, whatever device the user 110 uses to consume the service, the device is such that it may be connected to the network infrastructure 140.

A service offered to the user 110 by the partner 130 may for example be access to one or more media contents, such as e.g. an audio content and/or a video content. An audio content may for example be a podcast, one or more music files, or similar. A video content may for example be a TV-show, a movie, a newscast, or similar. The user 110 may connect to for example a server 132 of the partner 130. The server 132 has access to a list 134 wherein information about the registered members (e.g. subscribers) of the partner 130 is stored. If a new user registers with the partner 130, or if an existing member e.g. stops paying for one or more services, closes a membership, or upgrades an existing membership, or similar, it is assumed that the partner 130 updates the list 134 accordingly such that the list 134 is always up-to-date. The list 134 may for example include information about a particular user, whether the particular user has paid or not paid any subscription fees, to which media contents the user should be allowed access, and so on and so forth.

The media contents are, however, not provided directly by the partner 130 to the user 110. Instead, as indicated by the arrow 152, the partner 130 has a partnership with a media content provider 120. The media content provider 120 stores one or more media contents, and may deliver a specific media content, or part of a specific media content, to the user 110 per request. For example, the partner 130 may provide the user 110 with a list of media contents available at the media content provider 120. The user 110 may, using a device such as a smartphone 114, request for one or more media contents, and the media content provider 120 may then deliver the requested media contents directly to the user 110. The user 110 and the content provider 120 are therefore not required to have any permanent relationship per se, but only a temporary relationship (as indicated by the dashed arrow 154) which may be reestablished each time a user 110 wants to access a media content available at the media content provider 120.

The media content provider 120 has one or more servers or server systems 122 connected to the network infrastructure 130. The one or more servers or server systems 122 may include (or at least be connected to) one or more data storages 124 in which e.g. the media contents themselves are stored.

An "ecosystem" or infrastructure such as illustrated in FIG. 1 allows the responsibility of handling e.g. user subscription and the responsibility of providing media content to be shared between the media content provider 120 and the partner 130. However, as described earlier herein, as there is no single part responsible for both user handling and content provision, there is a need for an improved way of safely providing a media content to the user 110 while assuring that the user requesting the media content has a right to access such media content.

As will now be described in more detail with reference to FIGS. 2a to 2c, the present disclosure provides a method of providing a media content in a computer network which may offer such an improvement.

Figure 2A:
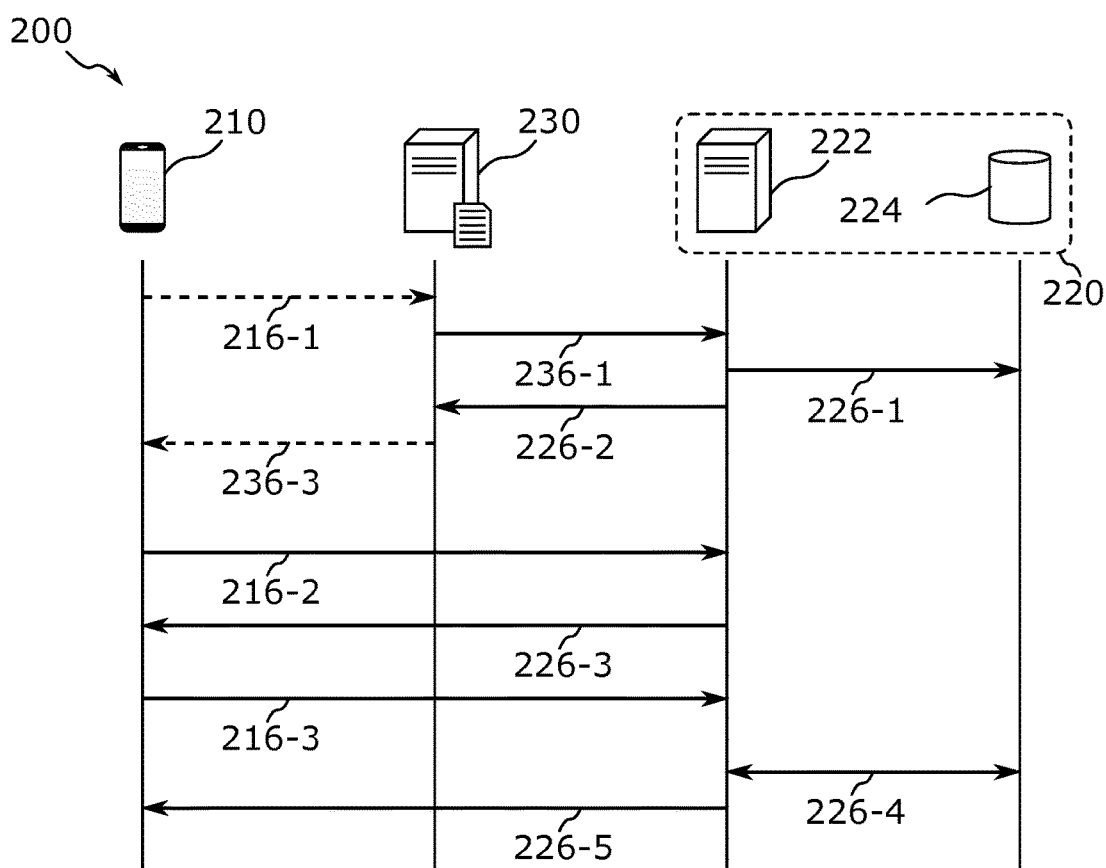
FIGS. 2a to 2c illustrate schematically flowcharts of various embodiments of a method according to the present disclosure.

FIG. 2a illustrates schematically a flowchart of an embodiment of a method 200. The method 200 is implemented on a server or server system 222 of a media content provider 220. The server system 222 is in communication with a data storage 224. In some embodiments, the data storage 224 and the server (system) 222 may be separate objects, and the data storage 224 and the server 222 may be located e.g. in a same room or even at separate locations. In other embodiments, the server (system) 222 and the data storage 224 may be provided together, and e.g. form part of a same server system. For example, the data storage 224 may be a part of the server 222 itself. In the flowchart of FIG. 2a, communication received and sent by the server 222 are illustrated with solid arrows, while communication between other parts (such as between the partner 230 and the user 210) are illustrated with dashed arrows.

In a first step, the server 222 receives a communication 236-1 from the partner 230, including a user identification (UID) and a content identification (ID). The UID identifies the user 210 registered with the partner 230, and the CID identifies a specific media content which the user 210 would like access to. Herein, a "specific media content" may for example be a movie, concert recording, music album, podcast, TV and/or audio series, or similar. A specific media content may also be e.g. a specific season of a series, a specific episode of a season, one of many parts of a specific episode, or similar. A specific media content may also be e.g. a music single, a specific song of a music album, or one of many parts of a specific song, etc.

The partner 230 may for example send the communication 236-1 after the user 210 has indicated to the partner 230 that the user 210 is interested in the specific media content. For example, it is envisaged that the partner 230 may provide (not shown) a list of available media contents to the user 210, and that the specific media content identified by the CID forms part of such a list. The user 210 may indicate to the partner 230, for example by sending a communication 216-1 to the partner 230, that the user wants access to the specific media content. After having received such an indication from the user 210, the partner contacts the media content provider by sending the communication 236-1. Alternatively, the partner 230 may wish to provide a media content to a particular user, as e.g. a reward or as part of an offer. The partner 230 may have knowledge of the user preferences in order to provide a dedicated offer. The partner 230 may thus choose to send the UID and the CID to the media content provider 220 without input from the user. In such an alternative, the communication 216-1 may be optional.

In a next step, the media content provider 220 generates a first token. The first token gets associated with the UID and CID obtained by the media content provider 220 from the partner 230, and it is then stored in the data storage 224. The CID and/or the UID may be stored together with the first token in the data storage 224. Storing of the first token in the data storage 24 is illustrated by the communication 226-1, sent from the server 222 to the data storage 224. The first token may for example be a random string of characters, or any other collection of data bytes obtained in a way such that the first token may be assumed to be unique for at least the UID, and possibly unique also for the combination of UID and CID. As an example, the data storage 224 may include a database table having at least a column "Token" and a column "UID", and possibly also a column "CID". Associating the first token with the UID and CID may for example be achieved by adding a new row to such a table, with the generated first token being stored in the column "Token" and the UID, and possibly also the CID, being stored in the columns "UID" and "CID", respectively. Such a table may also have further columns. For example, there may be a column "Active" indicating whether a specific row should be taken into account when e.g. searching for one or more rows containing a specific token stored in the column "Token". The names for the various columns, and/or the exact structure of the database table, may of course be different and still fulfill the purpose of associating the first token with the UID, and optionally with the CID, in a controlled way.

In a next step, or at least in a step taken in connection with the storing of the first token in the data storage 224, the media content provider 220 provides a reference to a web resource to the partner 230 by sending a communication 226-2 from the server 222. The reference includes a second token which may be equal to, or correspond to, the first token, or at least be associated with the first token. Here, "associated with" means that the first and second tokens are somehow related such that it may be understood from the second token that it belongs together with the first token. Phrased differently, it is to be understood that the second token, if different from the first token, is such that it may be traced back to the first token. The media content provider 220 may obtain this by for example storing a list/database relating the first token and the second token together, or by for example including additional columns to the above described database table for associating the first token with the UID (and optionally the CID). For example, the above database table may have additional columns "Token2", "Token3", etc., wherein tokens related to the first token may be stored. Alternatively, the relationships may be stored in a separate database table, for example in a table containing columns "Token", "Token2", "Token3", etc, and wherein a first token is stored in the column "Token" and the tokens related to the first token are stored in "Token2", "Token3", etc. Alternatively, a database table may include a column "Token" (for storing a first token) and a column "RelToken" for storing a related token. In such a database table, one row may be inserted for each token related to a first token. Other database table configurations, or other means of storage, may of course also be used as long as a first token may be related to one or more additional tokens. In some embodiments, a token related to the first token may contain the first token itself plus some additional data bytes, such that the relationship may be figured out by studying the related token alone.

The "web resource" may for example be a document, script or some other file provided somewhere online and to which access may be requested by the user. The reference may for example be a link, such as a Uniform Resource Locator (URL), to the web resource. For example, the web resource may be a file/script "file1", and the reference may be a URL like "http://server.com/folder/subfolder/file1?t=<token2>" or similar, where "<token2>" is the second token provided to the partner 230 from the media content provider 220 and the server 222. The file "file1" may for example be a script which, when accessed by a user, provides an output depending on the input parameter t (i.e. on the token "<token2>"). The exact names of parameters may of course be chosen differently.

After having sent the communication 226-2, the media content provider 220 may await a response from the user 210. Meanwhile, the partner 230 may provide a communication 236-3 to the user 210, informing the user 210 about the reference to the web resource (as provided by the media content provider 220 in the communication 226-2), including information about the second token. The information received by the user 210 from the partner 230 may for example be used by an application running on a device controlled/possessed by the user 210, such as a smartphone, tablet, laptop or similar. It is envisaged that the user 210 may user different applications to e.g. provide the communication 216-1 to the partner 230 and to provide e.g. a request for the web resource. In one scenario, however, the user 210 may have first identified himself/herself (e.g. logged in) to a server of the partner 230 using for example an Internet browser on a computer or laptop and may then need to use another device, such as a smart phone or tablet, supporting the use of applications in order to consume the media content and, thus, first request the web resource.

In a next step, the server 222 receives a communication 216-2 from the user 210, including a first request from the user. The first request may be a request from the user to access the web resource, and the first request may include the second token. The first request may for example be a Hypertext Transfer Protocol (HTTP) request (such as a HTTP GET or POST request) to the server 222, requesting the web resource to be delivered to the user 210. For example, a minimal HTTP POST request may include a request-line "POST /folder/subfolder/file1 HTTP/1.1", a host header field "Host: server.com" and a request body including "t=<token2>". In some embodiments, the method 200 may optionally include validating that the token provided by the user 210 when performing the request, i.e. the "<token2>", is a valid token. This may be achieved e.g. by comparing the token received from the user 210 with a token stored in the data storage 224. If no corresponding token is found in the data storage 224, or if the data storage 224 somehow indicates that the user 210 providing the token should not be granted the access, the media content provider 220 may for example deny the request from the user 210 to access the web resource, or at least indicate (via e.g. a communication) to the user 210 that the access is not granted. In other embodiments, an alternative media content may be provided to the user 210 by the media content provider 220 if the above validation fails.

After receiving the communication 216-2 from the user 210, the media content provider 220 and the server 222 may proceed by providing the web resource (e.g. the file "file1") to the user 210 in a communication 226-3. The web resource may identify a network location and include a third token. The third token may for example be equal to (or correspond to) one or both of the first and second tokens, or at least be associated with/related to one or both of the first and second tokens as described above. For example, the web resource may be a structured document, such as for example an RSS-document (as in Rich Site Summary, or as in other related backronyms) or similar formatted using Extended Markup Language (XML). The web resource may for example include an element "<enclosure>", including an attribute "url=<network location>", where "<network location>" is the network location identified in the web resource. For example, "<network location>" may equal "http://server.com/folder/subfolder/media.mp3?t=<token3>", where "<token3>" is the third token. Phrased differently, the third token may be appended to the network location. In some embodiments, the token may be included by other means, for example in its own element, as an own attribute, or similar, of the web resource. It is of course also possible that the web resource may be of a different format than a structured XML document. The web resource may for example be defined using a JavaScript Object Notation (JSON) format, or any other format which allows to communicate the network location and the third token to the user 210. The format of the web resource may or may not be human readable.

After providing the network location and third token to the user 210, the media content provider 220 may then await a further response from the user 210. For example, in a next step, the media content provider 220 may receive a communication 216-3 from the user 210, including a second request from the user 210. The second request may include the user 210 requesting access to the network location provided to the user 210 in the communication 226-3. The second request, i.e. the communication 216-3 sent from the user 210 to the server 222 of the media content provider 220, also includes the third token.

After having received the second request (i.e. the communication 216-3) from the user 210, the media content provider 220 may confirm whether the user 210 is allowed to access the network location, and e.g. whether the user 210 is allowed an access to at least part of the media content. This may be achieved at least by comparing the third token (included in the communication 216-3) with the first token stored in the data storage 224. For example, the media content provider 220 may check whether the third token directly matches, or is at least related to/associated with, a token stored in the data storage 224. If such a direct match, or relation, is confirmed, the media content provider 220 may provide at least part of the media content to the user 210 in a communication 226-5. If such a direct match, or relation, is not confirmed (e.g. if there is no token directly matching, or being related to/associated with, the third token in the data storage 224), the media content provider 220 may choose e.g. not to provide the communication 226-5 to the user 210, or to include e.g. an error message or similar in the communication 226-5, informing the user 210 about the failed confirmation. Other alternatives are also envisaged. For example, if the confirmation fails, the media content provider 220 may decide to provide less than the full media content, a modified version of the media content, and/or a different media content, to the user 210 in the communication 226-5.

The provided method offers the media content provider 220 to act in different ways depending on whether the third token provided by the user 210 directly matches, or is found to be related to/associated with, a token stored in the data storage 224. Also, in addition or as an alternative, the provided method also offers the media content provider 220 to act in different ways depending on e.g. a current status of the user 210. For example, it may be communicated to the media content provider 220 (from e.g. the partner 230) that the user 210 has a certain "user status". Herein, a "user status" may for example be a free, non-paying user; a paying, regular user; or e.g. a paying, premium user. Depending on the user status, the media content provider 220 may decide if any part of the requested media content is to be provided to the user 210, and, if yes, which parts of the full media content that is to be provided to the user 210.

In one example, it may be decided that the user 210 is a free, non-paying user. The media content provider 220 may then decide to provide a modified version of the media content to the user 210. For example, the media content may be modified to include one or more commercials or similar. If the user 210 is e.g. a paying, regular user, one or more commercials may still be included in the media content but it may be envisaged that the number of commercials is then lower than if the user 210 is a free, non-paying user.

In another example, it may be decided that the user status is not sufficient to access the full media content. The media content provider 220 may then decide to provide only part of the media content, e.g. a media content not including exclusive bonus content or similar, to the user 210. This may for example be the case if the user 210 is a free user, or a regular user, but not a premium user, or similar. If the user 210 is, however, determined to be a premium user, the media content provider 220 may decide to provide access to the full media content.

In another example, it may be decided that the user status is sufficient to only view a short summary, and/or e.g. only an introductory part, of a media content. Such a decision may also be taken based on a confirmation that the third token does not directly match, or is not related to/associated with, a token stored in the data storage 224 (e.g. if the user 210 is not a registered user with the partner 230, or if e.g. the user 210 is a registered user which has not paid the required fees, or similar).

Numerous other examples of how the media content provider 220 may decide whether to provide any media content, or which part of a specific media content, to the user 210 based on a comparison of the third token with a token (i.e. the first and/or second token) stored in the data storage 224 and/or a certain user status are also envisaged.

In some embodiments, the media content provider 220 may base such a decision based on a user policy or similar. For example, the media content provider 220 may obtain information about a network location (e.g. an IP address) of the user 210, and use this information when making the decision. The media content provider 220 may for example check whether the request from the user 210 originates from one or more specific network addresses. This may include, for example, also determining whether the user 210 has tried to previously access the media content more than a specific number of times from a same network address, or from more than a specific number of different network addresses. The user 210 may for example be allowed to access a media content from only a limited number of different network locations (e.g. from home, from work, from a mobile device, or similar). The media content provider 220 may be provided information (from e.g. the partner 230) about such restrictions for the user 210 and act accordingly when making the decision (i.e. when confirming whether to allow the user 210 access to at least part of the media content). The restrictions may for example be part of a user policy. The user 210 may for example be allowed to access a certain media content only once, or be allowed to access a certain media content more than one time.

Other restrictions may for example include the user 210 only being allowed to access part of a media content not more than a specific number of times. In addition, or as an alternative, restrictions may apply such that the user 210 is only allowed to access at least part of the media content during a specific time window. Such a time window may for example include a certain number of minutes, hours, days, months, years, or similar, starting at the time the user 210 registers with the partner 230 and/or pays a certain fee to the partner 230. It is envisaged that the time window may be extended by the user 210 performing some action, e.g. by paying an additional fee or similar to the partner 230, e.g. by renewing or extending a subscription.

In some embodiments, it is envisaged that the media content provider 220 may gather statistical information about the various requests made by the user 210 to various media contents, and that the media content provider 220 may provide such information to the partner 230. For example, the media content provider 220 may count the number of times the user 210 is allowed access to at least part of a certain media content, and/or the number of times the user 210 is allowed access to at least part of any media content. The media content provider 220 may provide this information to the partner 230, and the partner 230 may e.g. decide how much to charge the user 210 based on the provided statistical information. It may for example be envisaged that the user 210 is allowed access to one or more media contents as long as the user 210 is a registered user with the partner 230, and that the user 210 then pays per access according to a "pay-per-view/listen" fee schedule, or similar.

In the embodiment of the method 200 described with reference to FIG. 2a, it is envisaged that the partner 230 contacts the media content provider 220 (e.g. by the communication 236-1) to provide the UID and CID in order to generate the first token based on the UID and CID. An alternative method will now be described with reference to FIG. 2b.

Figure 2B:
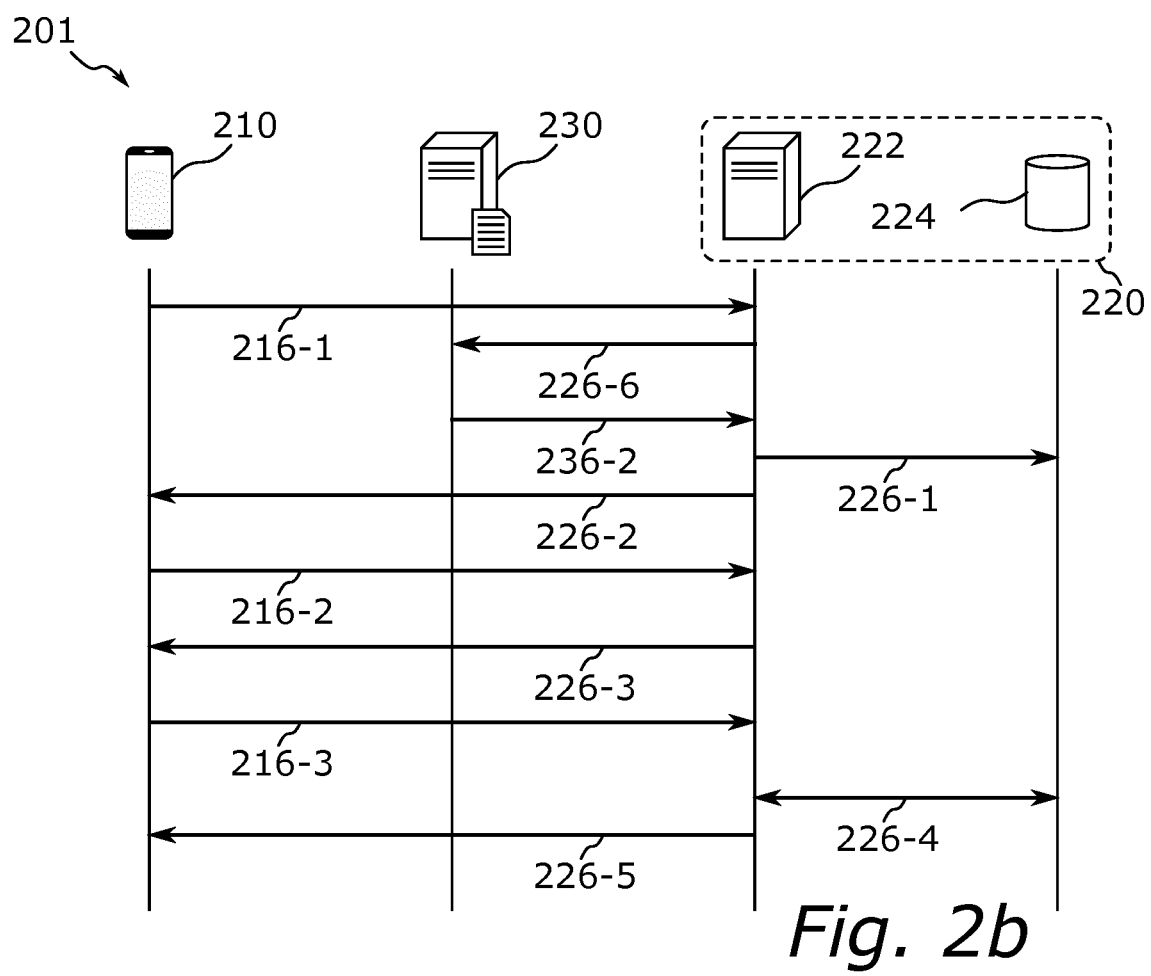

FIG. 2b illustrates another embodiment of a method 201 similar to the method 200 described with reference to FIG. 2a, but wherein the media content provider 220 instead obtains the UID and CID directly from the user 210 in the communication 216-1. After having received the communication 216-1 from the user 210, the media content provider 220 contacts the partner 230 in a communication 226-6. The communication 226-6 may for example include the received UID and CID, along with a request for confirmation by the partner 230 whether the user 210 (as identified by the UID) is a registered user with the partner 230, and/or whether the user 210 should be allowed access to any part of the requested media content (as identified by the CID). If more than one partner is available, the media content provider 220 may for example know which partner to contact for verification based on e.g. one or both of the UID and the CID. The media content provider 220 then awaits such a confirmation from the partner 230. The confirmation may for example be provided from the partner 230 to the media content provider 220 in a communication 236-2. If the user 210 is not a registered user with the partner 230, and/or if the user 210 is not to be allowed the access, the communication 236-2 may contain a corresponding indication. The media content provider 220 may then continue, if suitable, to generate the first token based on the UID and CID as described earlier. If the confirmation from the partner 230 is negative, it is envisaged that the media content provider 220 may for example ignore the communication 216-1 from the user 210, or at least indicate to the user 210 that the confirmation was negative. This may be performed by sending another communication (not shown) to the user 210. Such another communication may be sent e.g. from the media content provider 220, or e.g. from the partner 230. If the user 210 is not confirmed to be a registered user with the partner, it is envisaged that the method 201 may e.g. not attempt to generate the first token and instead stop.

The method of the present disclosure does not require that the user 210 requests access to the network location and the media content directly, or at least shortly, after the user 210 has received the reference to the web resource (i.e. in the communication 226-2) or the web resource itself (i.e. in the communication 226-3) from the media content provider 220. This is possible as the one or more tokens are associated with the user (UID) and the requested media content (CID).

A further embodiment of the method according to the present disclosure will now be described with reference to FIG. 2c.

Figure 2C:
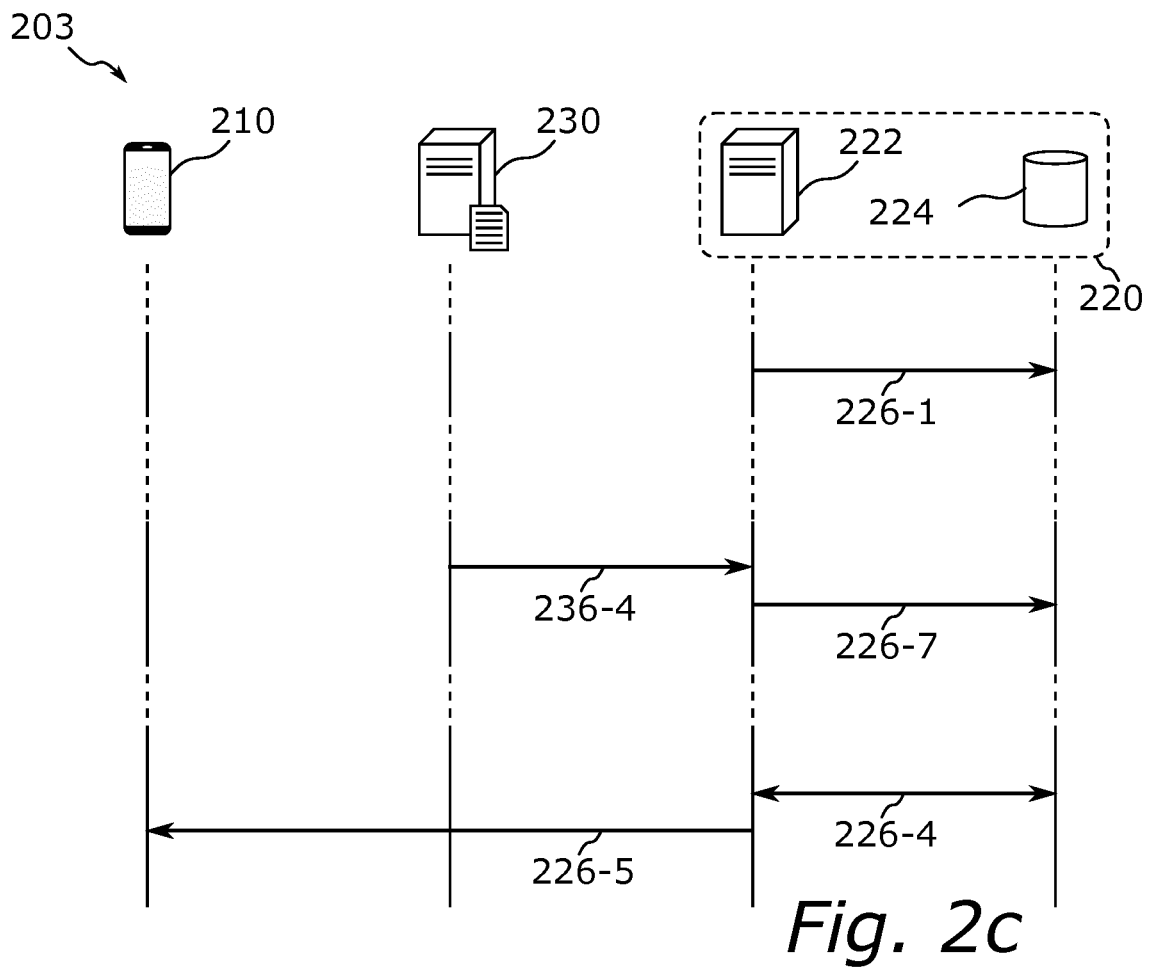

FIG. 2c illustrates a method 202 similar to the methods 200 and 201 described with reference to FIGS. 2a and 2b, respectively, but wherein the media content provider 220 receives an indication from the partner 230 in a communication 236-4. The indication contains information whether the user 210 is allowed access to the media content (as defined by CID), and the media content provider 220 updates the data storage 224 accordingly (e.g. by a corresponding communication 226-7). The communication 236-4 may be received by the media content provider 220 from the partner 230 before the media content provider 220 determines, by consulting the data storage 224, whether the user 210 should be allowed the access to the network location and to at least part of the media content. For example, the communication 236-4 may include an indication that the first token (or any token related thereto/associated therewith) is no longer to be considered as valid, and the media content provider 220 may act by e.g. removing, or invalidating, the first token from/in the data storage 224. Invalidating a token may for example include, in a database table including a column "Active", indicating in this column that a specific row corresponding to the UID and first token is no longer active. This allows the media content provider 220 and the partner 230 to securely determine whether access should be allowed to the media content for a specific user even if some time has passed between the user 210 receiving the reference to the web resource, or the web resource itself, and the user 210 attempting to access the network location and the at least part of the media content. For example, the user 210 may have stopped paying for a subscription between the instant the user received the web resource indicating the network location at which the media content may be accessed and the instant the user requests access to the network location and the media content.

In general, the method of the present disclosure allows for the media content provider 220 to securely deliver media content to a user 210 registered with a partner 230, while making sure that access to the media content is given to the user 210 only if the user fulfills certain conditions. The responsibility of managing e.g. user subscription and/or payments may therefore be separated from the provision of the actual media content. The partner 230 may handle the former, while the media content provider 220 may handle the latter. In addition, it is envisaged also that the media content provider 220 may provide media contents to users associated/registered with multiple partners.

By associating a generated token with a specific user (e.g. with a specific UID), the method according to the present disclosure also provides a more flexible way of providing a media content to a user, in that the form of the provided media content may be adapted based on e.g. a user policy, user status and/or multiple other user related variables. The method is not limited to provide a certain media content only once, but a same token (e.g. the first token or any token related thereto) may be used multiple times for a same user. This allows to provide the user access to the media content more than once, without each time having to go through the process of getting and validating a new token. More generally, the disclosed method allows for providing an authorized/registered/paying user with exclusive access to a media content in a fragmented ecosystem, in that the user may register with a partner but receive a media content from a media content provider different from the partner. The disclosed method allows providing exclusive access to the media content even though the media content provider does not need to possess any information about the user other than a token associated with the user. By providing the token itself, or other tokens related thereto/associated therewith to the user, and by expecting the user to return such a token at a later stage, a check of whether the user should be allowed the access may be performed at the moment the user finally requests access to a network location containing/providing the media content, even though some time may have passed between the user receiving the token and the user making the final request to access the network location and the media content. This allows the method to take into account, before granting final access to the media content, whether e.g. new information has been received from the partner indicating that the user should no longer be allowed the access.

Figure 3:
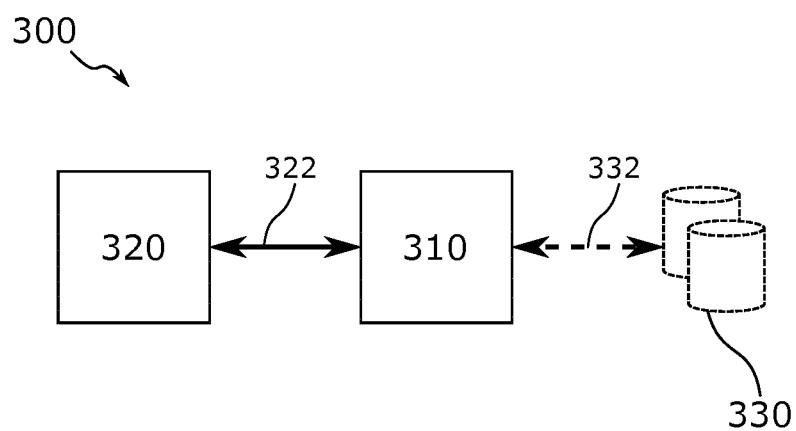
FIG. 3 illustrates schematically an embodiment of a server system according to the present disclosure.

With reference to FIG. 3, a server system for providing a media content in a computer network will now be described in more detail.

FIG. 3 illustrates an embodiment of a server system 300. The server system 300 includes a processor 310 and a non-transitory computer readable medium 320. The medium 320 stores instructions corresponding to a method as described herein (e.g. the method 200, 201 or 202). The processor 310 may communicate (as indicated by the arrow 322) with the medium 320, such that the processor 310 may execute the instructions and perform the method. Although illustrated as separate parts, it is envisaged also that the processor 310 and the medium 320 may be integrated into a single component. The processor 310 and the server system 300 may also communicate (as illustrated by the dashed arrow 332) with a data storage 330. The data storage 330 may or may not be part of the server system 300. It is further envisaged (not shown) that the server system 300 has means with which it may connect to a network infrastructure such as e.g. the Internet, in order to communicate with e.g. a user and/or a partner as described herein.

The person skilled in the art realizes that the present disclosure is by no means limited to the embodiments described above. On the contrary, many modifications and variations are possible within the scope of the appended claims.

Although features and elements are described above in particular combinations, each feature or element may be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A method of providing a media content in a computer network, comprising, in a server system of a media content provider:
   a) obtaining a user identification, UID, of a user registered with a partner of the media content provider, and a content identification, CID, of a media content offered by the media content provider;
   b) generating a first token associated with the obtained UID and CID;
   c) storing the first token in a data storage;
   d) providing a reference to a web resource to at least one of the user or to the partner, the reference including a second token equal to, or at least associated with, the first token;
   e) receiving a first request from the user to access the web resource, the first request including the second token;
   f) providing the web resource to the user, the web resource identifying a network location and including a third token equal to, or at least associated with, at least one of the first token or the second token;
   g) receiving a second request from the user to access the network location, the second request including the third token;
   h) confirming, based at least on a comparison of the third token with the first token stored in the data storage, whether the user is allowed an access to at least part of the media content; and
   i) if confirming in step h) that the user is allowed the access, providing at least part of the media content to the user;
   wherein the method further comprises obtaining, before step h), an indication from the partner on whether the user is allowed the access and invalidating or removing the first token in/from the data storage if it is indicated that the user is not allowed the access.

2. The method of claim 1, comprising receiving the indication from the partner after at least step d).

3. The method of claim 1, step h) comprising confirming whether the user is allowed the access based on a user policy.

4. The method of claim 1, step h) comprising confirming whether the user is allowed the access based on whether the second request originates from one or more specific network addresses.

5. The method of claim 1, step h) comprising confirming whether the user is allowed the access based on whether the user has previously accessed at least part of the media content more than a specific number of times.

6. The method of claim 1, step h) comprising confirming whether the user is allowed the access based on whether the second request is made within a predefined time window.

7. The method of claim 1,
   step h) comprising confirming whether the user is allowed access to only a part of the media content or a whole of the media content, and
   step i) comprising:
      if it is confirmed in step h) that the user is allowed access to only a part of the media content, providing only said part of the media content to the user, or
      if it is confirmed in step h) that the user is allowed access to a whole of the media content, providing said whole of the media content to the user.

8. The method of claim 1, further comprising:
   j) if it is confirmed in step h) that the user is not allowed the access, providing no part of the media content, only a part of the media content or a different media content to the user.

9. The method of claim 1, the web resource being a structured document, preferably an RSS document or another document of an XML format, and including an element identifying the network location.

10. The method of claim 1, further comprising gathering statistical information regarding the user and attempts at accessing the media content, and providing at least part of the statistical information to the partner.

11. The method of claim 1, step a) comprising receiving the UID and the CID from the partner.

12. The method of claim 1, step a) comprising receiving the UID and CID from the user,
   Ethe method further comprising contacting the partner to confirm whether the user is allowed an access to at least part of the media content identified by the CID.

13. A server system for providing a media content in a computer network, comprising:
   a computer processor, and
   a non-transitory computer readable medium storing instructions operable, when executed by the computer processor, to cause the computer processor to perform a method including:
      a) obtaining a user identification, UID, of a user registered with a partner of a media content provider, and a content identification, CID, of a media content offered by the media content provider;
      b) generating a first token associated with the obtained UID and CID;
      c) storing the first token in a data storage;
      d) providing a reference to a web resource to at least one of the user or to the partner, the reference including a second token equal to, or at least associated with, the first token;
      e) receiving a first request from the user to access the web resource, the first request including the second token;
      f) providing the web resource to the user, the web resource identifying a network location and including a third token equal to, or at least associated with, at least one of the first token or the second token;
      g) receiving a second request from the user to access the network location, the second request including the third token;
      h) confirming, based at least on a comparison of the third token with the first token stored in the data storage, whether the user is allowed an access to at least part of the media content and i) if confirming in step h) that the user is allowed the access, providing at least part of the media content to the user;

wherein the method further comprises obtaining, before step h), an indication from the partner on whether the user is allowed the access and invalidating or removing the first token in/from the data storage if it is indicated that the user is not allowed the access.

14. A non-transitory computer readable medium storing instructions operable, when executed by a computer processor, to perform a method comprising:

a) obtaining a user identification, UID, of a user registered with a partner of a media content provider, and a content identification, CID, of a media content offered by the media content provider;

b) generating a first token associated with the obtained UID and CID;

c) storing the first token in a data storage;

d) providing a reference to a web resource to at least one of the user or to the partner, the reference including a second token equal to, or at least associated with, the first token;

e) receiving a first request from the user to access the web resource, the first request including the second token;

f) providing the web resource to the user, the web resource identifying a network location and including a third token equal to, or at least associated with, at least one of the first token or the second token;

g) receiving a second request from the user to access the network location, the second request including the third token;

h) confirming, based at least on a comparison of the third token with the first token stored in the data storage, whether the user is allowed an access to at least part of the media content and i) if confirming in step h) that the user is allowed the access, providing at least part of the media content to the user;

wherein the method further comprises obtaining, before step h), an indication from the partner on whether the user is allowed the access and invalidating or removing the first token in/from the data storage if it is indicated that the user is not allowed the access.

* * * * *